United States Patent [19]
Nelson

[11] Patent Number: 4,750,943
[45] Date of Patent: Jun. 14, 1988

[54] THERMOPHOTOVOLTAIC SYSTEM
[75] Inventor: Robert E. Nelson, Weston, Mass.
[73] Assignee: TPV Energy Systems, Inc., Waltham, Mass.
[21] Appl. No.: 923,841
[22] Filed: Oct. 27, 1986

Related U.S. Application Data
[63] Continuation-in-part of Ser. No. 834,927, Feb. 28, 1986, abandoned.

[51] Int. Cl.$^4$ .............................................. H02N 6/00
[52] U.S. Cl. ................................................... 136/253
[58] Field of Search ......................................... 136/253

[56]         References Cited
          U.S. PATENT DOCUMENTS

| | | | |
|---|---|---|---|
| 3,331,707 | 7/1967 | Werth | 136/253 |
| 3,751,303 | 8/1973 | Kittl | 136/253 |
| 3,929,510 | 12/1975 | Kittl | 136/247 |
| 4,106,952 | 8/1978 | Kravitz | 136/248 |
| 4,187,123 | 2/1980 | Diggs | 136/206 |
| 4,234,352 | 11/1980 | Swanson | 136/253 |
| 4,313,024 | 1/1982 | Horne | 136/253 |
| 4,316,048 | 2/1982 | Woodall | 136/253 |
| 4,331,829 | 5/1982 | Palazzetti | 136/253 |
| 4,419,532 | 12/1983 | Severns | 136/253 |
| 4,528,417 | 9/1985 | Chubb | 136/253 |
| 4,584,426 | 4/1986 | Nelson | 136/253 |

OTHER PUBLICATIONS
White et al., "P-I-N" Structures for Controlled Spectrum Photovoltaic Converters, Advisory Group for Aerospace Research and Development North Atlantic Treaty Organization, pp. 897-922, (1967).
Kittl et al., "Design Analysis of TPV-Generator System", Proc. 25th Annual Power Sources Conf., (1972).
Guazzoni et al., "Cylindrical Erbium Oxide Radiator Structures for Thermophotovoltaic Generators", R & D Technical Report ECOM-4249, pp. 1-27, (1974).
DeMichelis et al., "A Solar Thermophotovoltaic Converter", Solar Cells, vol. 1, pp. 395-403, (1979).

Primary Examiner—Aaron Weisstuch

[57]             ABSTRACT

A thermophotovoltaic energy conversion system includes a thermal energy source and a narrow band emitter spaced and optically isolated from the thermal energy source. Thermal energy is transferred between the thermal energy source and the emitter by a non-radiative mechanism, such as a closed loop fluid flow path that interconnects the thermal energy source and the narrow band emitter. A photocell array is disposed in optically coupled relation to the narrow band emitter for generating an electrical output in response to radiation from the narrow band emitter.

27 Claims, 1 Drawing Sheet

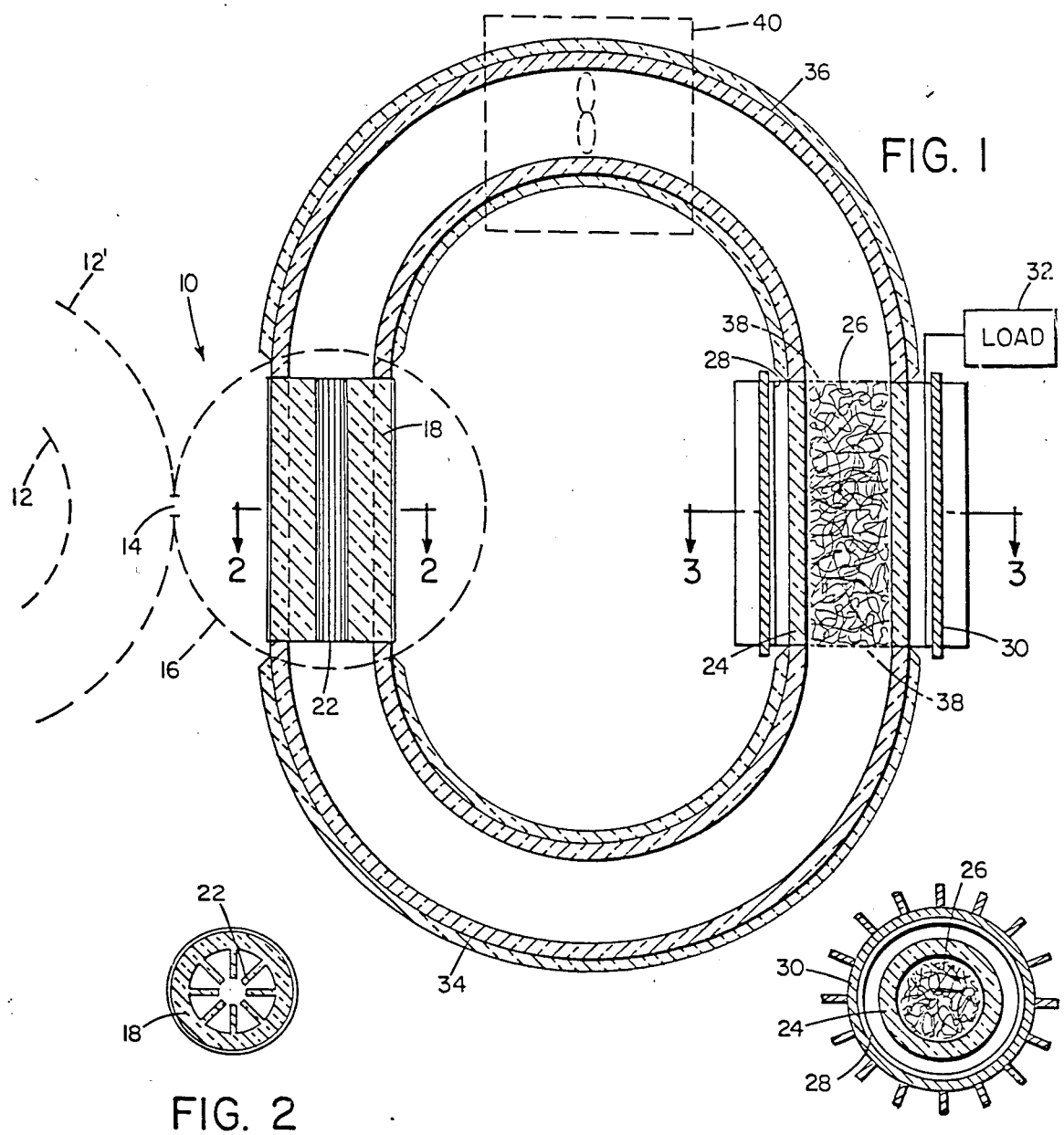
FIG. 1
FIG. 2
FIG. 3
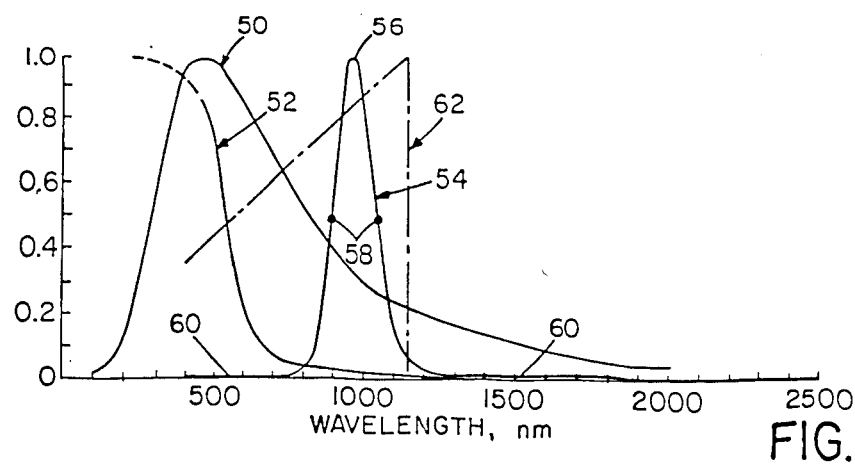
FIG. 4

THERMOPHOTOVOLTAIC SYSTEM

This invention relates to energy conversion, and more particularly to thermophotovoltaic systems for conversion of thermal energy to electrical energy.

Photovoltaic power sources in the form of heavy duty photovoltaic solar cells that produce usefully high voltages and currents when exposed to sunlight are well known, one such type of solar cell being the silicon cell. The conversion efficiencies of such power sources are relatively low for a variety of factors, including thermal and wavelength considerations. For example, some of the solar energy merely heats the solar cell while other portions of the solar energy are either reflected back towards the sun or pass through the solar cell; the specific spectral energy of solar radiation does not provide a good spectral match with the response of a silicon photovoltaic cell, the maximum spectral radiance in sunlight occurring at about 500 nanometers (significantly below the about 1100 nanometers maximum efficiency conversion wavelength of silicon) and those portions of solar radiation with wavelengths longer than 1100 nanometers are not used in the photovoltaic conversion process and merely generate heat in the cell, thereby requiring an increased cooling effort to keep the cell at its best performance.

Efforts to increase conversion efficiencies of thermophotovoltaic power sources include proposals for using trace amounts of a rare earth oxide in the radiation converter; collector systems of the cassegrainian and/or reflecting cavity types; and silicon, alumina or similar material for storing thermal energy.

In accordance with the invention, there is provided a thermophotovoltaic energy conversion system that includes a thermal energy source and a narrow band emitter optically isolated from the thermal energy source. Thermal energy is transferred from the source to the emitter by a non-radiative mechanism, such as a closed loop fluid flow path that interconnects the thermal energy source and the narrow band emitter. A photocell array is disposed in optically coupled relation to the narrow band emitter for generating an electrical output in response to incident radiation from the narrow band emitter.

The thermal energy source may take various forms including, for example, a solar energy absorber, a nuclear reactor (such as a high temperature gas reactor of the UHTREX type), radioisotope material, or a chemical flame, and preferably provides a temperature of at least about 1300° C. In preferred embodiments, the source and emitter are interconnected by a closed loop fluid flow path and thermal energy is convectively transferred by flow of a low emissivity gas.

In preferred embodiments, the narrow band emitter is of a rare earth metal oxide in sheet or fiber form, for example, that has a cross sectional dimension in the range of 5-30 micrometers. In the case of fiber-type emitters, the small diameter of each fiber lessens thermal stress in the diametral direction and the long thin fibers flex to reduce longitudinal stress. The thin fibers, furthermore, couple well thermally to the hot convection gases since there are no significant boundary layers. Thus, the fibers reach very high temperatures and are in approximate thermal equilibrium with the circulating gas. Optically, except for the absorption arising from the electronic transition that is desired, the small optical thickness of the thin fiber limits the off-band absorption (emission) that arises in most ceramics from loss mechanisms such as free carrier absorption or lattice defects.

In particular embodiments, the narrow band emitter is composed of interlocked fibers of at least one oxide of a host rare earth metal selected from the class consisting of erbium, holmium, neodymium, and ytterbium, which, when heated to 1700° C., emit radiation in a spectral irradiance profile that has a narrow radiated flux peak that is located less than 400 nanometers below the electron production threshold of the photocell array, the radiated flux of the emitter having a full width at half maximum (at one half the maximum radiated flux of the emitter) of less than 400 nanometers and the spectral irradiance profile having suppressed skirt characteristics such that at wavelengths 500 nanometers above and below the peak wavelength, the skirts have radiated fluxes per unit wavelength that are less than ten and more preferably less than five percent of the profile peak radiated flux per unit wavelength. Examples of narrow band emitters matched to photocell characteristics include a ytterbia emitter and a silicon photocell and an erbia emitter and a germanium photocell. In a particular embodiment, the emitter is housed within an aluminum oxide (Lucalox TM) optically transparent tube and the photocell array is disposed around the transparent tube and mounted on heat sink structure. Insulated ceramic tube sections interconnect the aluminum oxide tube and the thermal energy source. Where solar radiation is the source of thermal energy, appropriate solar energy collecting means such as a reflector system and a spherical reflecting cavity in which a tubular broad band absorber is disposed preferably concentrates incoming solar radiation for impingement on the broad band absorber. As such thermal transducers receive and release energy by the same mechanism, a narrow band emitter cannot simultaneously be a broad band absorber. Radiation isolation is provided between the absorber and the emitter and a low emissivity gas (a gas without significant infrared active fundamental vibrations, such as a monotomic gas, for example, helium or argon, or a homonuclear diatomic, (for example, oxygen or nitrogen, or mixtures of such gases)), transfers thermal energy from the absorber to the emitter by convection. Preferably, the gas has emissivity of less than one percent of black-body radiation in wavelength regions up to one micron above the electron production threshold of the photocell. In a particular embodiment, the absorber is a tubular member of silicon carbide, and as appropriate, a reemission limiting layer of suitable material, for example, a layer of thoria and ceria that limits reemission at wavelengths above about one micrometer may be provided on the absorber.

Other features and advantages of the invention will be seen as the following description of a particular embodiment progresses, in conjunction with the drawing, in which:

FIG. 1 is a diagrammatic view of a thermophotovoltaic converter system in accordance with the invention;

FIGS. 2 and 3 are sectional views taken along the lines 2—2 and 3—3 respectively of FIG. 1; and FIG. 4 is a graph indicating spectral characteristics of thoria-ceria emittance, outer space solar spectrum, narrow band emitter exitance, and idealized photovoltaic response of silicon.

DESCRIPTION OF PARTICULAR EMBODIMENT

Shown in the diagrammatic view of FIG. 1 is an energy converter system that includes a solar energy collector and concentrator system 10 that includes reflectors diagrammatically indicated at 12, 12' for concentrating solar radiation through aperture 14 into spherical reflecting cavity diagrammatically indicated at 16. Disposed in cavity 14 for receiving the concentrated solar radiation is ceramic (silicon carbide) absorber tube 18. Ceramic flow guide structure 22 is disposed within tube 14 as also indicated in FIG. 2.

Spaced from absorber tube 18 is aluminum oxide (Lucalox) cylindrical window 24 in which is disposed emitter 26 of random ytterbia fibers. Surrounding emitter window cylinder 24 is a cylindrical array of silicon photocells 28 that are mounted on heat sink structure 30. Preferably the front surfaces of photocells 28 carry an anti-reflection coating to minimize reflection losses; and the silicon photodiodes are preferably about one millimeter in thickness to maximize photon conversion. Provision of a textured front surface and a reflecting layer (for example of silver, aluminum, or copper) on the back contacts of the photocells 28 further enhance the probability of photo conversion. Load 32 is connected to the array of photodiodes 28.

Insulated ceramic pipe sections 34, 36 interconnect absorber tube 18 and emitter window tube 24 to provide a closed loop flow path. Fiber retention structure (diagrammatically indicated at 38) may be included in the flow path adjacent emitter 26 for enhancing thermal interchange between the gas flow in the closed loop and the emitter fibers 26. Where free convection transfer rates are not adequate, a ceramic bladed fan mechanism (diagrammatically indicated at 40) may be inserted into the circulation loop. A process for manufacturing the array of ytterbia fibers includes the steps of imbibing absorbent organic fibers in an aqueous solution of ytterbium nitrate, and then thermally processing the imbibed absorbent fibers under controlled conditions of the type described in U.S. Pat. No. 4,584,426 issued Apr. 22, 1986 and entitled "Thermophotovoltaic Technology" and assigned to the same assignee as this application (the disclosure of which is expressly incorporated herein by reference), in a thermal denitration process to form ytterbia and to pyrolyze and remove the organic substrate material and then exposing the resulting ytterbia fibers to a temperature of about 1600° C. for five minutes to further shrink and densify the metal oxide fibers. The resulting ytterbia fibers substantially retain characteristic physical attributes of their precursor organic fibers although with substantially reduced dimensions.

In system operation, solar radiation (spectrum 50—FIG. 4) as concentrated by reflector system 12 and concentrating cavity 14 impinges on ceramic absorber tube 18 and heats the low emissivity gas (air, helium, nitrogen or other suitable gas or gas mixture) in the closed flow loop of tubes 18, 34, 24, and 30 to a temperature of about 1700° C. The hot gas stream circulates in the closed loop (with assistance of circulation enhancer 40 if free convection transfer rates are not adequate or for use in zero gravity environments) and heats the ytterbia emitter fibers 26 to temperatures approaching 1700° C. The emitter fibers 26 produce radiation output in a spectral irradiance profile as indicated by curve 54 in FIG. 4, that profile having a flux peak 56 at about 980 nanometers, peak 56 having a full width at half maximum (at points 58) of about 185 nanometers and the spectral irradiance profile having suppressed skirt characteristics such that skirts 60 have radiated flux levels that are less than two percent of the profile peak radiated flux per unit wavelength. The electron production threshold of the silicon photocells 28 is 1150 nanometers, as indicated by the idealized silicon response curve 62 in FIG. 4. The ytterbia fibers 26 when heated to about 1700° C. thus provide a high output peak in close proximity to the electron production threshold of the silicon photocells 28 such that the electrical energy conversion efficiency of the system is high—about 80 percent of the total radiated flux output of emitter fibers 26 over the 400-2500 nanometer wavelength range being convertible into electrical energy on the basis of the theoretical silicon cell response indicated in FIG. 4.

While a particular embodiment of the invention has been shown and described, various modifications will be apparent to those skilled in the art, and therefore it is not intended that the invention be limited to the disclosed embodiment or to details thereof, and departures may be made therefrom within the spirit and scope of the invention.

What is claimed is:

1. A thermophotovoltaic energy conversion system comprising
   a thermal energy source,
   a narrow band emitter optically and conductively isolated from said thermal energy source,
   a photocell array disposed in optically coupled relation to said narrow band emitter for generating an electrical output in response to incident radiation from said narrow band emitter, and
   structure defining a closed loop fluid flow path interconnecting said thermal energy source and said narrow band emitter for transferring thermal energy from said thermal energy source to said narrow band emitter.

2. The thermophotovoltaic energy conversion system of claim 1 wherein said thermal energy source is selected from the group consisting of solar energy absorbers, nuclear reactors, radioisotope materials, and chemical flames.

3. The thermophotovoltaic energy conversion system of claim 1 wherein said thermal energy source provides a temperature of at least about 1300° C.

4. The system of claim 1 wherein said narrow band emitter, when heated to 1700° C., emits radiation in a spectral irradiance profile that has a narrow radiated flux peak that is located less than 400 nanometers below the electron production threshold of said photocell array.

5. The system of claim 1 wherein said narrow band emitter includes an array of metal oxide filaments, each said filament having a cross-sectional dimension in the range of 5-30 micrometers.

6. The system of claim 1 wherein said narrow band emitter is composed of ytterbia and said photocell array is of the silicon type.

7. The system of claim 1 wherein said narrow band emitter is composed of erbia and said photocell array is of the germanium type.

8. The system of claim 1 wherein said source includes a broad band absorber disposed in said closed loop fluid flow path, said broad band absorber including a tubular member of high temperature material.

9. The system of claim 8 wherein said tube of high temperature material has a radiation reemission limiting layer of thoria-ceria on its surface.

10. A thermophotovoltaic energy conversion system comprising
a thermal energy source,
a narrow band emitter optically isolated from said thermal energy source,
a photocell array disposed in optically coupled relation to said narrow band emitter for generating an electrical output in response to incident radiation from said narrow band emitter,
structure defining a closed loop fluid flow path interconnecting said thermal energy source and said narrow band emitter, and
a low emissivity gas in said closed loop flow path structure for convectively transferring thermal energy from said thermal energy source to said narrow band emitter.

11. The system of claim 10 wherein said gas has emissivity of less than one percent of black-body radiation in wvelength regions up to one micron above the electron production threshold of said photocell array.

12. A thermophotovoltaic energy conversion comprising
a thermal energy source,
a narrow band emitter optically isolated from said thermal energy source, said narrow band emitter having cross-sectional dimensions in the range of 5-30 micrometers,
a photocell array disposed in optically coupled relation to said narrow band emitter for generating an electrical output in response to incident radiation from said narrow band emitter for transferring thermal energy from said thermal energy source to said narrow band emitter,
structure defining a closed loop fluid flow path interconnecting said thermal energy source and said narrow band emitter, said closed loop fluid flow path structure including an optically transparent tubular member of high temperature material, said narrow band emitter being disposed in said tubular member.

13. The system of claim 12 wherein said narrow band emitter includes an array of metal oxide filaments.

14. The system of claim 12 wherein said narrow band emitter is composed of ytterbia and said photocell array is of the silicon type.

15. The system of claim 12 wherein said narrow band emitter is composed of erbia and said photocell array is of the germanium type.

16. The system of claim 12 wherein said thermal energy source is selected from the group consisting of solar energy absorbers, nuclear reactors, and radioisotope materials, and provides a temperature of at least about 1300° C., and said thermal energy is convectively transferred to said emitter by flow of a low emissivity gas.

17. The system of claim 16 wherein said low emissivity gas is a gas without significant infrared active fundamental vibrations selected from the group consisting of monotomic gases, homonuclear diatomic gases, and mixtures thereof.

18. The system of claim 12 wherein said source includes a broad band absorber disposed in said closed loop fluid flow path, said broad band absorber including a finned thermal transfer member of high temperature material that forms part of said closed loop fluid flow path.

19. The system of claim 18 and further including solar energy collecting means comprising a reflector system and a spherical reflecting cavity, said broad band absorber member being disposed in said spherical reflecting cavity, and said solar energy collecting means concentrating incoming solar radiation for impingement on said broad band absorber.

20. The system of claim 18 wherein said closed fluid flow path is formed of insulated ceramic tubular material.

21. The system of claim 20 wherein said narrow band emitter includes an array of metal oxide filaments that, when heated to 1700° C., emits radiation in a spectral irradiance profile that has a narrow radiated flux peak that is located less than 400 nanometers below the electron production threshold of said photocell array.

22. The system of claim 21 wherein said thermal energy is convectively transferred to said emitter by flow of a low emissivity gas.

23. The system of claim 22 wherein said low emissivity gas is a gas without significant infrared active fundamental vibrations selected from the group consisting of monotomic gases, homonuclear diatomic gases, and mixtures thereof.

24. The system of claim 23 wherein said thermal energy source provides a temperature of at least about 1300° C.

25. The system of claim 24 wherein said thermal energy source is selected from the group consisting of solar energy absorbers, nuclear reactors, and radioisotope materials.

26. A thermophotovoltaic energy conversion system comprising
a thermal energy source,
a narrow band emitter optically and conductively isolated from said thermal energy source,
a photocell array disposed in optically coupled relation to said narrow band emitter for generating an electrical output in response to incident radiation from said narrow band emitter,
structure defining a closed loop fluid flow path interconnecting said thermal energy source and said narrow band emitter,
said closed loop fluid flow path structure including structure defining a first passage portion extending from said thermal energy source to said narrow band emitter and a second passage portion extending from narrow band emitter to said thermal energy source, and
a low emissivity gas in said closed loop flow path structure for convectively transferring thermal energy from said thermal energy source to said narrow band emitter.

27. The system of claim 26 wherein said passage portions of said closed fluid flow path are formed of insulated ceramic tubular material.

* * * * *